Patented Oct. 8, 1940

2,217,605

UNITED STATES PATENT OFFICE 2,217,605

METHOD FOR THE PRODUCTION OF CELLULAR RUBBER MASSES

Mitchell Carter, Trenton, N. J., assignor, by mesne assignments, to Dunlop Tire and Rubber Corporation, Buffalo, N. Y., a corporation of New York No Drawing. Application September 14, 1938, Serial No. 229,874

18 Claims. (Cl. 260—723)

This invention relates to the production of cellular rubber masses, usually called "sponge rubber," from liquid latex or similar aqueous dispersions of rubber or rubber-like materials. For purposes of this specification the term "sponge rubber" will be used generally to include all such cellular rubber masses or articles, and the term "latex" will be used to include all such aqueous dispersions of rubber or rubber-like materials including pre-vulcanized latex.

In the past much sponge rubber has been made from dried rubber to which has been added gas forming agents which form gas cells in the rubber during the curing or vulcanizing operation. The known processes for making such sponge rubber and the products resulting therefrom are subject to many objections which are well known in the art.

More recently much sponge rubber has been made directly from latex, and the quality of the sponge rubber so produced has been generally superior to that produced from dried rubber. In most cases, when sponge rubber has been produced directly from latex, the latex has been treated, while still in liquid form, to aerate the same—that is, to incorporate air bubbles therein, which, when the latex is subsequently gelled and cured or vulcanized, form the desired cellular structure in the finished product. Various treatments such as stirring, whipping, beating and blowing have been used to aerate the latex. However, so far as I am aware, all prior processes for producing sponge rubber directly from latex have proposed to use latex to which had been added so-called "foaming agents" intended to assist in the formation or stabilization of the air bubbles or foam in the latex. These agents have included such materials as soap or soap forming substances, casein, glue, gelatine, licorice, molasses, sugar, saponin, albumin and the like. These materials are sometimes added to latex to facilitate concentrating and centrifuging the same, and are present in such latices when sold in the open market. On the other hand, such materials are sometimes added to latex for the sole purpose of assisting in the formation of bubbles or foam for the production of sponge rubber.

I have discovered that the use of such foaming agents has a deleterious effect on the sponge rubber produced from latices either containing such foaming agents or to which such foaming agents have been added. I have also discovered that the presence of such foaming agents makes necessary the use of many precautions in the application of heat for curing or vulcanization if rupture and breakdown of the cellular structure is to be avoided.

It is an object of the present invention to provide a process for the production of sponge rubber from latex which is free of such foaming agents.

Other objects and advantages of the invention will appear hereinafter.

According to the present invention I first treat latex which is free of foaming agents to aerate the same so that the latex itself becomes, in effect, a foam. Any of the known methods of aerating or foaming latex containing a foaming agent may be used for this purpose, but I prefer to use for this purpose a beater of a type similar to the well known types of motor driven egg beaters or cake mixers procurable commercially for kitchen use.

The concentration of the latex used is preferably in the neighborhood of 55% (dry rubber content), for I find that if the concentration is less than 45% a sufficiently stable foam cannot be formed without the presence of a foaming agent. The air bubbles tend to break and latex, water and any added compounding ingredients tend to settle out. Satisfactory foams may be formed with latex of concentrations higher than 55%, although when the concentration exceeds this amount it is somewhat more difficult to incorporate sufficient quantities of air. However, this difficulty may be overcome by blowing air into the body of latex while it is being beaten. In cases where latex of concentration greater than 55% is used, a stiff foam may be formed, but in most cases it is desirable that the foamed latex should remain in a creamy, flowable state in order that it may be poured into molds for subsequent curing or vulcanization. If a stiff foam is formed, it may be brought to a creamy, flowable state by adding unbeaten latex, either with or without compounding ingredients added, or by adding compounding ingredients dispersed in liquid.

The aerating treatment is continued for such time as may be necessary to incorporate the desired amount of air in the latex. There is a certain maximum aeration possible for any given batch of latex, of course, but I have found it possible to incorporate 7 parts of air to 1 part of latex without difficulty, and this is more than sufficient for most commercial purposes. In practice, I continue the operation of the beater at relatively high speed until the desired aeration is accomplished, and then reduce the speed of the beater to a point where additional air is not introduced. In this manner the foam may be maintained until used as hereinafter described.

I have discovered that the time required for the formation of the foam can be greatly reduced by warming the latex. Thus, for example, by test I have found it possible to produce equal aeration in similar batches of latex in the following times at the temperatures stated:

10° C. requires 15 minutes beating
    20° C. requires 6 minutes beating
    40° C. requires 2.5 minutes beating
    50° C. requires 50 seconds beating Since warming above 50° C. does not result in any great decrease in beating time, I prefer not to warm the latex above this temperature.

I prefer to aerate the latex as previously described before adding compounding, vulcanizing, accelerating, softening, anti-aging, coloring and other ingredients or agents commonly used in the art to produce a product of the desired characteristics. It may be noted, however, that the presence of usual quantities of ammonia in the latex as a preservative, either as purchased, or added subsequently, is not objectionable, as it does not interfere with the preparation of the latex foam as previously described. The ingredients or agents above mentioned, and hereinafter referred to generally as compounding ingredients, may be added in any convenient manner, but I prefer to disperse them in water and to mix them with the aerated latex in this form. It is also possible to disperse said ingredients in water and then to mix them with a separate body of unaerated latex to form a compounded latex. This, in turn, may be added to the aerated latex in the desired proportions.

This latter method has certain advantages, in that the addition of unaerated latex does not change the size of the air bubbles, but merely changes their wall thickness. Therefore, by this method the wall thickness of the bubbles may be controlled as desired.

Thus there are several possibilities depending upon the results desired. The foamed latex may be retained in creamy, flowable form, and the dispersed compounding ingredients may either be added directly or may be mixed with unaerated latex and then added. On the other hand, the latex may be formed into a stiff foam and the dispersed compounding ingredients may be added directly or may be mixed with unaerated latex and then added. In this case the stiff foam is reduced to a creamy, flowable form.

A gelling agent is also added, but preferably the gelling agent is added last, just before pouring into molds, for if added to the latex any considerable time before pouring, the mixture may set up so that it cannot be poured. I prefer to use ammonium nitrate as a gelling agent, mixing equal parts of granular ammonium nitrate and water for convenience in adding it to the latex. Between 1½ and 3 parts of this ammonium nitrate solution to 100 parts of latex is usually sufficient.

One of the disadvantages of the prior art processes which have employed the so-called "foaming agents" has been that extreme precautions were necessary in curing and vulcanizing in order to avoid rupture of the cellular structure. A prolonged exposure to heat at a temperature usually of about 60° C. has been required to permit the cellular mass to gel, and a further prolonged exposure to heat at a temperature approximating but not exceeding 100° C. has been required for vulcanization. According to the present invention these precautions are unnecessary, as I am not only able to immediately subject latex, prepared as hereinbefore described, to temperatures above 100° C., but I find it advantageous to do so. For example, a mold containing such latex can be immediately placed in a steam chamber maintained at 30 lbs. per square inch gauge pressure (giving a temperature of approximately 135° C.) and cured in about 30 minutes. Even higher pressures and temperatures may be used if desired. It will be understood, however, that lower temperatures may be used for curing, if desired. For example, a mold containing such latex may be subjected to vapor at a temperature between 95° and 100° C. and cured in about 1½ hours.

Preferably the latex, prepared as hereinbefore described, is poured immediately after preparation into warm molds, maintained at a temperature between 40° and 95° C., and immediately placed in a curing or vulcanizing chamber as previously described. However, it is to be understood that the latex may be aerated at room temperature and poured into molds at room temperature, and may still be cured or vulcanized according to either of the foregoing methods with good results. If the mold is to stand cold for any considerable period of time, however, additional gelling agent should be added in order to cause the latex to gel while cold. This procedure is somewhat less satisfactory, however, for greater shrinkage occurs in the final product.

As a specific example of the practice of my process, take 200 parts of 55% (dry rubber content) latex which is free of soap or other "foaming agent," heat the same to a temperature between 40° and 50° C. and beat the same with an ordinary motor driven beater until the volume is increased five times by aeration. Then slow down the beater to maintain this volume. Then while still stirring add 12 parts of the following mixture of compounding ingredients:

| | Parts |
|---|---|
| Water | 99 |
| Stablex B | 1 |
| DuPont 552 accelerator | 10 |
| Zinc oxide | 40 |
| Sulphur | 50 |

Then, while still stirring add 3 parts of the previously described ammonium nitrate solution. Continue stirring for about 1 minute, then pour into a warm mold or molds and place in a steam vulcanizer at 30 lbs. per square inch gauge pressure for approximately 30 minutes. Note that the zinc oxide, or activator of the vulcanizing ingredients, is added to the latex after same is frothed.

In some cases in mixing certain other compounding ingredients for subsequent mixture with the aerated latex it may be desirable to add small quantities of one or more protective colloids to the compounding mixture, as for example, the Stablex B in the specific example given above. Some substances known and used in the art as protective colloids, as for example, soaps and casein, are the same as those used as the "foaming agents" previously referred to. However, the function and action of these substances when added to said compounding ingredients is completely different from the function and action of the same substances when added to the latex for the purpose of forming or stabilizing foam therein, as proposed in the prior art. I have observed, however, that if soap is used even for this purpose, it has a deleterious effect on the final product.

It will be understood that the invention may be variously modified and embodied within the scope of the subjoined claims.

I claim as my invention:

1. Process for the production of cellular rubber masses from latex which comprises aerating latex which is free of added soap or other foam forming or stabilizing agents to form a foam, adding a vulcanizing agent thereto, adding a gelling agent thereto, and then immediately subjecting said mixture to temperatures in excess of 100° C. to cure the rubber mass.

2. Process for the production of cellular rubber masses from latex which comprises aerating latex of a concentration in excess of 45% and which is free of added soap or other foam forming or stabilizing agents to form a foam, then adding compounding ingredients to said foam, then adding a gelling agent thereto, and then molding the same.

3. Process for the production of cellular rubber masses from latex which comprises aerating latex which is free of added soap or other foam forming or stabilizing agents to form a foam, dispersing compounding ingredients in a separate body of unaerated latex, mixing this body with the foam, adding a gelling agent thereto, and then molding the same.

4. Process for the production of cellular rubber masses from latex which comprises aerating latex which is free of added soap or other form forming or stabilizing agents to form a foam, mixing with said foam a body of unaerated latex, adding a gelling agent thereto, and then molding the same.

5. A method of making cellular rubber which comprises frothing an aqueous dispersion of rubber without the addition of a foam stabilizing agent, adding a vulcanizing ingredient and zinc oxide to the froth, and setting the froth.

6. A method of making cellular rubber articles which comprises frothing an aqueous dispersion of rubber without the addition of a foam stabilizing agent, adding a vulcanizing agent, zinc oxide, and a latex gelling agent to the froth, introducing the froth mixture in a mold, and allowing it to gel and set without collapse to form the cellular rubber article of the desired shape.

7. A process of making macroporous or cellular rubber which comprises frothing an aqueous dispersion of rubber without the addition of a foam forming or stabilizing agent, a vulcanizing ingredient being present in the froth, adding a coagulant and zinc oxide to the froth, causing the foam to set without collapse in the form of the desired product, and vulcanizing the set foam.

8. A process of making macroporous or cellular rubber which comprises frothing an aqueous dispersion of rubber without the addition of a foam stabilizing agent, a vulcanizing ingredient and a coagulant being present in the froth, and adding an activator of the vulcanizing ingredient to the froth, the coagulant setting the froth and vulcanizing the set froth.

9. A process of making macroporous or cellular rubber which comprises frothing an aqueous dispersion of rubber without the addition of a foam stabilizing agent, a vulcanizing ingredient being present in the froth, and adding zinc oxide to the froth and setting the froth.

10. A process of making macroporous or cellular rubber which comprises frothing an aqueous dispersion of rubber in the absence of zinc oxide and an added foam forming or stabilizing agent, a vulcanizing ingredient being present in the froth, adding zinc oxide to the froth, setting the froth without collapse, and vulcanizing the set froth.

11. An article of manufacture produced in accordance with the process of claim 8.

12. Process for the production of cellular rubber masses from latex which comprises frothing latex which has no added foam forming or stabilizing ingredient therein by simultaneously beating same while blowing air thereinto, adding a gelling agent and a vulcanization activator to the frothed latex, molding the frothed latex to the desired shape, and vulcanizing the molded frothed latex.

13. In a process for the production of cellular rubber masses from frothed latex, the step of controlling the wall thickness of the resultant product by adding unfrothed latex to the frothed latex prior to gelling same.

14. Process for the production of cellular rubber masses from latex which comprises aerating latex which is free of added soap or other foam forming or stabilizing agents to form a foam, adding a vulcanizing agent and an activator to the foam, adding a gelling agent thereto to gel same, and then placing said mixture in a steam chamber at super atmospheric pressure.

15. Process for the production of cellular rubber masses from latex which comprises aerating latex which is free of added soap or other foam forming or stabilizing agents to form a foam, adding a vulcanizing activator thereto, adding a gelling agent thereto, pouring the same into a warm mold maintained at a temperature in excess of 40° C. to gel the foam, and then subjecting said mold to temperatures of about 100° C. to cure the rubber mass in said mold.

16. Process for the production of cellular rubber masses from latex which comprises aerating latex of a concentration in excess of 45% and which is free of soap or other foam forming or stabilizing agents by beating same at high speed to form a foam, reducing the beating speed, then adding compounding ingredients to said foam, and then adding an activator thereto.

17. Process for the production of cellular rubber masses from latex which includes the steps of aerating latex of a concentration in excess of 45% which is free of soap or other foam forming or stabilizing agents and which is free of compounding ingredients to form a foam, and then adding ammonium nitrate solution to the foam to gel same.

18. A method of making macroporous or cellular rubber which comprises compounding the desired compounding ingredients with an aqueous dispersion of rubber, frothing said compounded dispersion without the addition thereto of a foam-forming or stabilizing agent, admixing a vulcanization activator with said frothed compounded dispersion, and causing the froth to set without collapse to form the desired product.

MITCHELL CARTER.